United States Patent [19]
Saimi et al.

[11] Patent Number: 5,315,574
[45] Date of Patent: May 24, 1994

[54] OPTICAL HEAD WITH POLARIZED BEAM HOLOGRAM

[75] Inventors: Tetsuo Saimi; Kazuo Momoo, both of Osaka; Makoto Kato, Nishinomiya, all of Japan

[73] Assignee: Matsushita Electric Industrial Co., Ltd., Osaka, Japan

[21] Appl. No.: 120,869

[22] Filed: Sep. 15, 1993

Related U.S. Application Data

[63] Continuation of Ser. No. 871,618, Apr. 21, 1992, abandoned, which is a continuation of Ser. No. 427,531, Oct. 27, 1989, abandoned.

[30] Foreign Application Priority Data

Oct. 28, 1988 [JP] Japan ................... 63-273545

[51] Int. Cl.$^5$ .......................................... G11B 7/00
[52] U.S. Cl. ............................... 369/109; 369/110; 369/44.37; 369/44.41
[58] Field of Search ........... 369/109, 110, 111, 112, 369/44.12, 44.23, 44.37, 13, 124, 44.38, 44.39, 44.41, 44.42; 350/162.17; 250/201.5

[56] References Cited

U.S. PATENT DOCUMENTS

| | | | |
|---|---|---|---|
| 4,491,940 | 1/1985 | Tinet | 384/46 |
| 4,649,351 | 3/1987 | Velkamp et al. | 350/162.17 |
| 4,833,561 | 5/1989 | Sunagawa et al. | 369/13 |
| 4,841,507 | 6/1989 | Imai et al. | 250/201.5 |
| 4,858,218 | 8/1989 | Takagi et al. | 369/109 |
| 4,879,706 | 11/1989 | Lee | 369/44.23 |
| 4,918,675 | 4/1990 | Lee | 369/15 |
| 4,929,823 | 5/1990 | Kato et al. | 250/201.5 |
| 4,989,189 | 1/1991 | Sander et al. | 369/13 |

FOREIGN PATENT DOCUMENTS

| | | | |
|---|---|---|---|
| 60-59545 | 4/1985 | Japan . | |
| 61-3330 | 1/1986 | Japan . | |
| 61-120352 | 6/1986 | Japan . | |
| 61-258339 | 11/1986 | Japan . | |
| 62-78755 | 4/1987 | Japan . | |
| 62-97141 | 5/1987 | Japan . | |
| 63-78350 | 4/1988 | Japan | 369/109 |
| 63-228429 | 9/1988 | Japan | 369/109 |

*Primary Examiner*—Tommy P. Chin
*Assistant Examiner*—Thai Tran
*Attorney, Agent, or Firm*—Lowe, Price, LeBlanc & Becker

[57] ABSTRACT

An optical head with a polarized beam hologram for optically recording and reproducing information on and from a recording medium. The optical head comprises an optical lens for converging a light beam emitted from a light source on the recording medium and a beam splitter provided between the light source and the optical lens for branching a light beam reflected from the recording medium. Also included in the optical head is a polarization type hologram for causing transmission or reflection of the light beam branched by the beam splitter and for polarizing the light beam so that a 0 order light and a + first-order diffracted light produced due to the polarization are cross polarized with respect to each other and the 0 order light and a − first-order diffracted light produced due to the polarization are cross polarized with respect to each other. The 0 order light, the + first-order diffracted light and the − first-order diffracted light from the hologram are respectively received by photodetectors.

15 Claims, 7 Drawing Sheets

OPTICAL HEAD WITH POLARIZED BEAM HOLOGRAM

This application is a continuation of application Ser. No. 07/871,618, filed Apr. 21, 1992, now abandoned, which is a continuation of application Ser. No. 07/427,531, filed Oct. 27, 1989, now abandoned.

BACKGROUND OF THE INVENTION

The present invention relates to an optical head with polarized beam hologram for optically recording and picking up information on and from an optical recording medium such as an optical disk.

Generally known is a system including an optical device such as a polarized beam splitter and a Wollaston prism to pick up or detect an information signal recorded on an information recording medium by using the polarization of an optical beam, as disclosed in the Japanese Patent Provisional Publication No. 62-78755. Further, the Japanese Patent Provisional Publication No. 62-97141 discloses a technique to pick up an information signal by using a polarization type hologram. This technique requires, in addition to the polarization type hologram, a polarized light separation device such as the polarized beam splitter and Wollaston prism for detection of polarized light. The additional provision of such a polarized light separation device causes complexity and size-enlargement of the optical head.

SUMMARY OF THE INVENTION

It is therefore an object of the present invention to provide an optical head which is capable of simplicity, size-reduction and cost-reduction by use of a multifunction polarization type hologram.

In accordance with the present invention, there is provided an optical head with a polarized beam hologram for optically recording and reproducing information on and from a recording medium. The optical head comprises an objective lens for converging a light beam emitted from a light source on the recording medium and a beam splitter provided between the light source and the objective lens for branching a light beam reflected from the recording medium. Also included in the optical head is polarization type hologram means for causing transmission or reflection of the light beam branched by the beam splitter and for causing polarization of the light beam so that a zero-order light and a + first-order diffracted light produced due to the polarization type hologram are crossed each other and the zero-order light and a − first-order diffracted light produced due to the polarization type hologram are crossed each other. The zero-order light, the + first-order diffracted light and the − first-order diffracted light from the hologram are respectively received by photodetector means.

The hologram means is arranged such that, when the distance between the recording medium and the objective lens is inadequate in terms of the focusing, the diameters or configurations of the light spots form on the photodetector means due to the + first-order and − first-order diffracted lights are different from each other, and when the distance therebetween is adequate, the diameters or configurations thereof are substantially equal to each other.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Figure 1A:
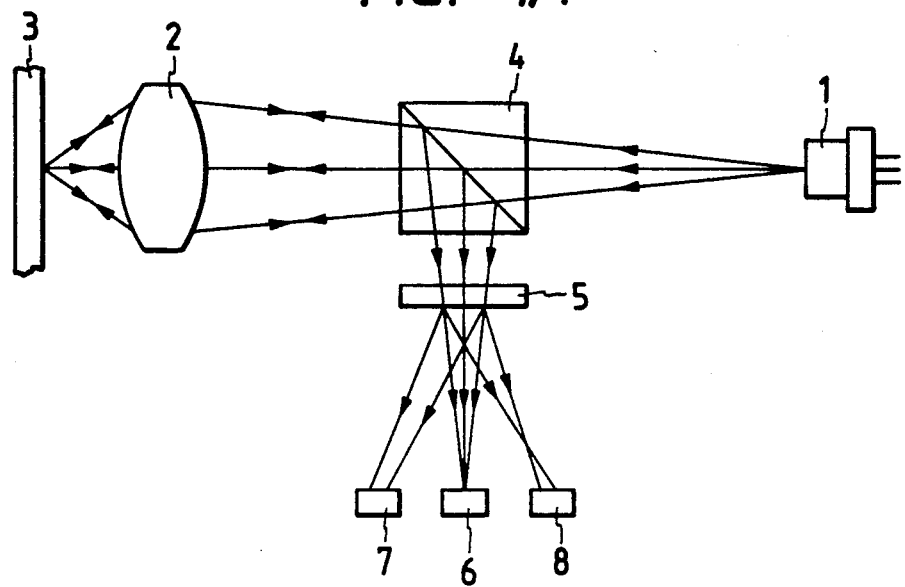
FIG. 1A is an illustration of an optical head with a polarized beam hologram according to an embodiment of the present invention.

Referring now to FIG. 1A, there is illustrated an optical head with a polarized beam hologram according to an embodiment of the present invention. In FIG. 1A, a light beam (diverging light beam) emerging from a semiconductor laser 1 reaches an objective lens 2 after passing through a beam splitter 4. The light beam converged or focused by the objective lens 2 is incident on an information recording medium such as an optical disk 3. A light beam reflected from the optical disk 3 again passes through the objective lens 2 so as to be converged and directed to the beam splitter 4 and is then reflected by the beam splitter 4. Although in the embodiment illustrated in FIG. 1A the light beam emitted from the semiconductor laser 1 first passes through the beam splitter 4, it is also appropriate that the light beam from the semiconductor laser 1 is first reflected by the beam splitter 4. The light beam (convergent light beam) reflected by the beam splitter 4 is incident on a polarization type hologram 5.

Figure 1B:
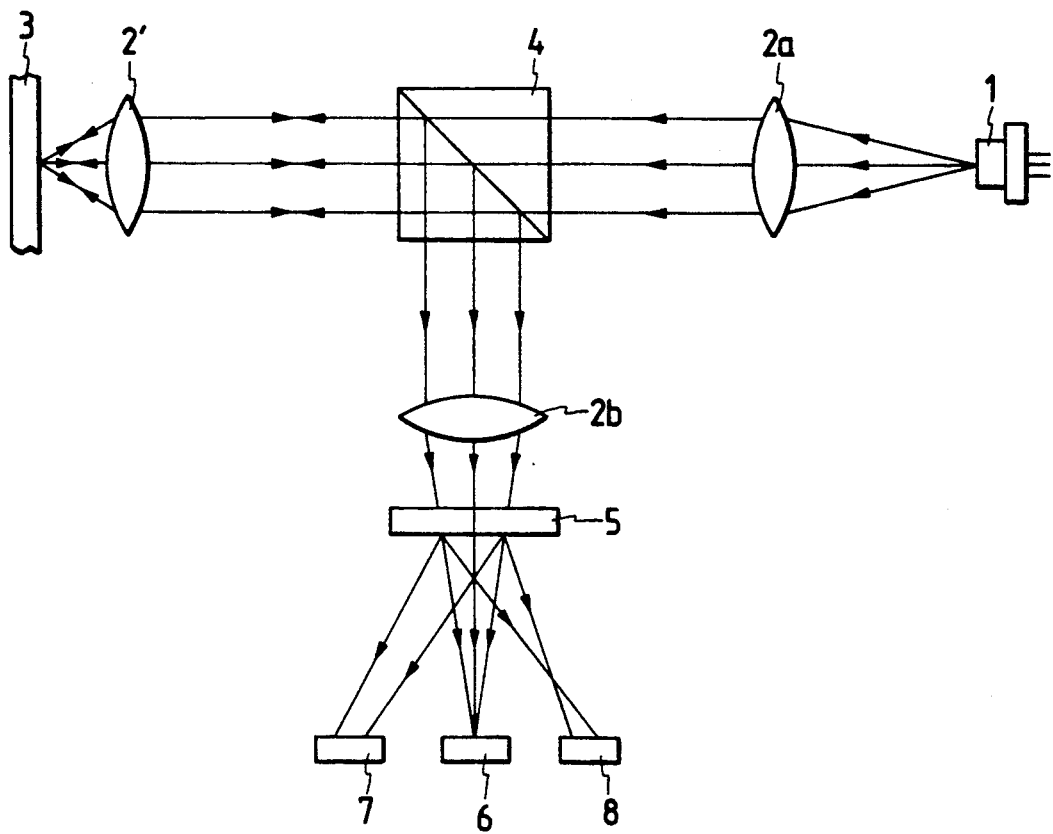
FIG. 1B shows a modification of the optical head with a polarized beam hologram according to the embodiment.

FIG. 1B shows a modification of the optical head with a polarized beam hologram according to this embodiment. In FIG. 1B, a light beam emerging from the semiconductor laser 1 is incident on an optical lens 2a so as to become a parallel beam and reaches an objective lens 2' after passing through the beam splitter 4. The light beam from the objective lens 2' is focused on the information recording medium 3. A light beam reflected by the recording medium 3 again passes through the objective lens 2' so as to become a parallel beam which is in turn reflected by the beam splitter 4 so as to be directed to an optical lens 2b. The light beam converged by the optical lens 2b is similarly incident on the polarization type hologram 5. Here, it is also appropriate that the optical lens 2b is placed between the polarization type hologram 5 and the detector assembly comprising the optical signal detectors 6, 7, 8.

Figure 2A:
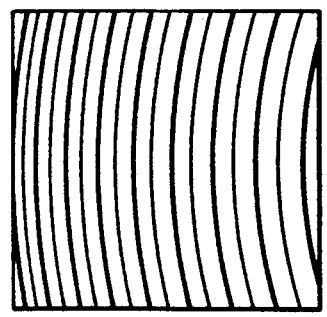
FIGS. 2A, 2B, 3A and 3B show arrangement of polarization type gratings.
Figure 2B:
Figure 3A:
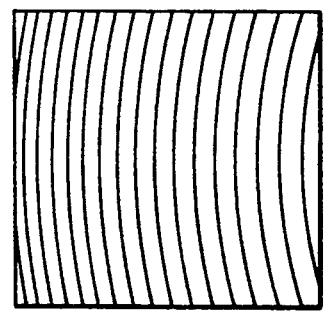
Figure 3B:

Generally, the polarization type hologram is arranged such that the P-polarization in the direction normal to the direction of the diffraction grating results in the zero-order light and the S-polarization in the direction parallel to the direction of the diffraction grating produces the + first-order diffracted light and the − first-order diffracted light. In this embodiment, the polarization type hologram 5 is constructed by a portion of a zone plate. Thus, the S-polarization results in the + first-order diffracted light and the − first-order diffracted light, and the P-polarization becomes the zero-order light. The light beams (± first-order diffracted lights and zero-order light) separated by the polarization type hologram 5 are respectively detected by optical signal detectors 7, 8 and 6 with the ± first-order diffracted lights being respectively and perpendicularly polarized to the zero-order light. FIGS. 2A and 2B show a polarization type grating, made of an anisotropy member, where relatively-shallow channels are formed, and FIGS. 3A and 3B show another polarization type grating, made of an isotropy member, where relatively deep channels are formed by the etching or pressing technique. With similar methods, it is possible to form the polarization type hologram 5 to be used in this embodiment.

If the signal of the optical disk 3 is recorded in accordance with the magneto-optical system, the signal can be reproduced by detecting the difference signal due to the P-polarization and the S-polarization separated by the polarization type hologram 5.

Moreover, since the polarization type hologram 5 is constructed by a portion of the zone plate, as shown in FIG. 1, the focusing positions of the + first-order diffracted light and the − first-order diffracted light are different from each other, and it is possible to obtain the focus error signal and the tracking error signal on the basis of these diffracted lights.

Figure 4A:
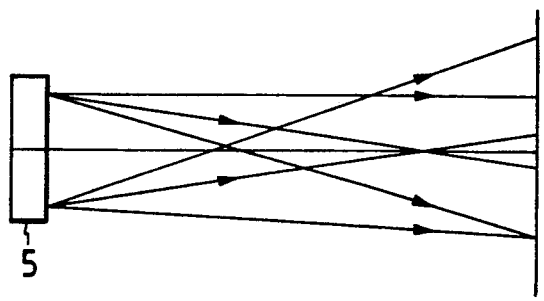
FIGS. 4A to 4C are illustrations for describing a method of obtaining a focus error signal and a magneto-optical signal in accordance with the FIG. 1 optical head.
Figure 4A:
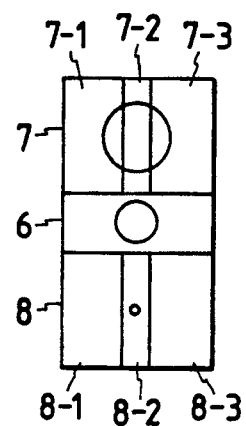
Figure 4B:
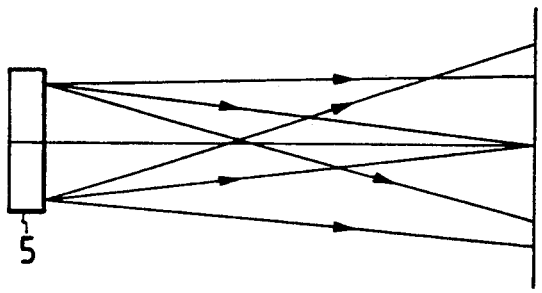
Figure 4B:
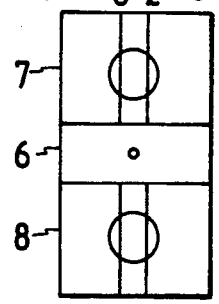
Figure 4C:
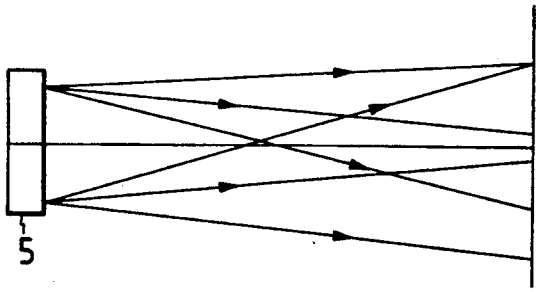
Figure 4C:
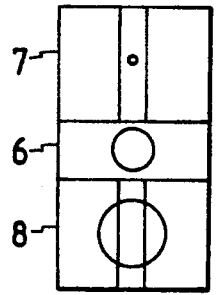

FIGS. 4A to 4C are illustrations for describing methods for obtaining the focus error signal and the magneto-optical signal, where only the polarization type hologram 5 and the optical signal detectors 6, 7, 8 are illustrated for simplicity. FIG. 4A shows the case that the disk 3 is apart from the objective lens 2 with respect to the focusing position of the objective lens 2, FIG. 4B illustrates the case that the disk 3 is placed at the focusing position of the objective lens 2 and FIG. 4C illustrates the state that the disk 3 is close to the objective lens 2 with respect to the focusing position thereof. That is, when the distance between the optical disk 3 and the objective lens 2 is inadequate or if the focusing state with respect to the optical disk 3 is inadequate, the diameters of the light spots formed by the ± first-order diffracted lights are different from each other. If the detectors 6, 7 and 8 have configurations as shown in FIGS. 4A, 4B or 4C, as disclosed in the Japanese provisional Publication Nos. 61-258339, 61-3330, 60-59545, the focus error signal can be attained on the basis of the outputs of the detectors, i.e., in accordance with the equation $(7-2) - (8-2)$ or $\{(7-1)+(7-3)+(8-2)\} - \{(7-2)+(8-1)+(8-3)\}$ where the numerals indicated in ( ) respectively represent the outputs of respective portions of the detectors 7 and 8 shown in FIG. 4A. Further, the information signal recording in accordance with the magneto-optical system can be obtained on the basis of the detector output, i.e., in accordance with the equation $\{(7-1)+(7-2)+(7-3)\} + \{(8-1)+(8-2)+(8-3)\} - (6)$ where (6) represents the output of the detector 6. In addition, in the case of being recorded with pits or variable density pattern, the information signal can be obtained on the basis of the detector output, i.e., $\{(7-1)+(7-2)+(7-3)\} + \{8-1)+(8-2)+(8-3)\} + (6)$.

Moreover, in the case that lines for dividing the detectors 7 and 8 into three portions is parallel to the track formed on the disk 3, the Farfield tracking error signal can be obtained, a method of obtaining the tracking signal being disclosed in U.S. Pat. No. 4,491,940. For example, the tracking signal can be obtained in accordance with the equation $\{(7-1)(8-3)\} - \{(7-3)+(8-1)\}$, or it can be attained by division of the polarization type hologram.

Figure 5A:
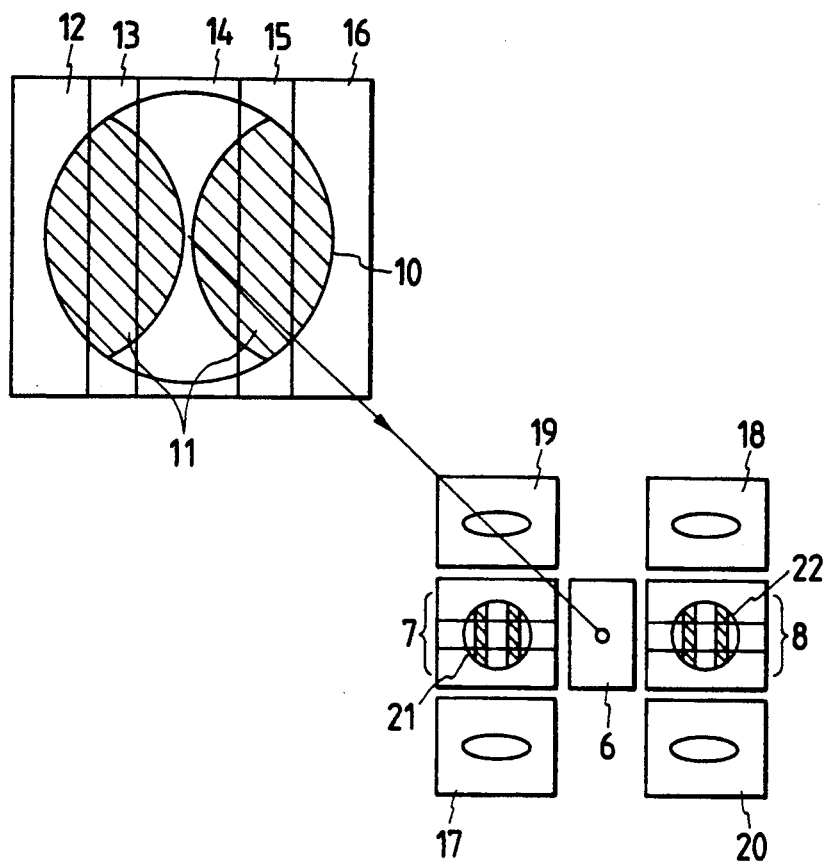
FIG. 5A shows an photodetector arrangement for obtaining a focus error signal, a tracking error signal and a magneto-optical signal by using a multi-window hologram.
Figure 5B:
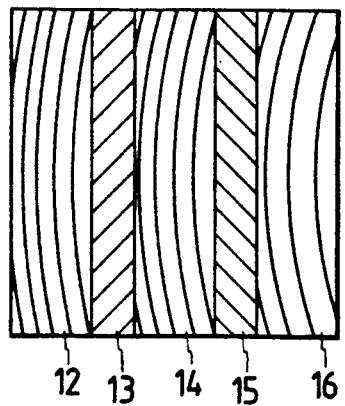
FIG. 5B is an illustration of an arrangement of a multi-window hologram.

FIG. 5A shows an detector arrangement for obtaining the focus error signal, tracking error signal and magneto-optical signal by using a multi-window polarization type hologram assembly. In FIG. 5A, a light beam 10 is projected on divided polarization type hologram portions 12 to 16. A tracking signal corresponding to the track position on the disk 3 causes partially forming, within the light spot formed by the projection of the light beam 10, a light portion or a dark portion 11 which depends upon the diffraction pattern of the track. With this arrangement, it is possible to obtain, at the same time, the polarization signal such as magneto-optical signal, the focus error signal and the tracking error signal. That is, the polarization type holograms 12, 14 and 16 are of the same type as illustrated in FIG. 5B, and the + first-order and − first-order diffracted lights due to the polarization type holograms 12, 14 and 16 are respectively incident on the detectors 7 and 8 so as to form light spots 21 and 22. Here, portions of the light spots 21 and 22 indicated by oblique lines are shaded due to diffraction by the polarization type holograms 13 and 15, thereby resulting in incidence on the other detectors as described hereinafter.

With the light beam passing through the polarization type hologram 13, the + first-order and − first-order diffracted lights are respectively incident on detectors 17 and 18, and with the light beam passing through the polarization type hologram 15, the + first-order and − first-order diffracted lights are incident on detectors 19 and 20. Thus, the focus error signal can be obtained on the basis of the outputs of the detectors 7 and 8 as described with reference to FIG. 4. The tracking error signal can be attained on the basis of the detector output, i.e., $\{(17)+(18)\} - \{(19)+(20)\}$, and the magneto-optical signal can be obtained by taking the sum of the outputs of the detectors which receive the + first-order and − first-order diffracted lights and further taking the difference between the sum thereof and the output of the detector 6 which receives the zero-order light.

Since the focus error signal is obtained on the basis of the outputs of the detectors 7 and 8, in the light spots 21, 22, there are no portions (oblique line portion) corresponding to the polarization type holograms 13 and 15. However, these portions scarcely affect the focus error signal and are preferable because of reducing the interference of the tracking error signal to the focus error signal.

It is preferable that the angle made by the + first-order and − first-order diffraction direction due to the polarization type hologram for obtaining the tracking error signal and the + first-order and − first-order diffraction direction due to the polarization type hologram for obtaining the focus error signal is as small as possible. This is because, as illustrated in FIG. 5B, the analyzing angles at the time of obtaining the magneto-optical signal are different in terms of the polarization type holograms 12, 14, 16, the hologram 13 and the hologram 15. As a method for reducing this angle is known the method of varying the carrier frequencies of the polarization type holograms 13 and 14. The variation of the carrier frequency of the polarization type hologram causes variation of the diffracted angle of the light beam diffracted by the polarization type hologram. In FIG. 5B, the carrier frequencies of all the polarization type holograms 12 to 16 are the same.

Figure 6A:
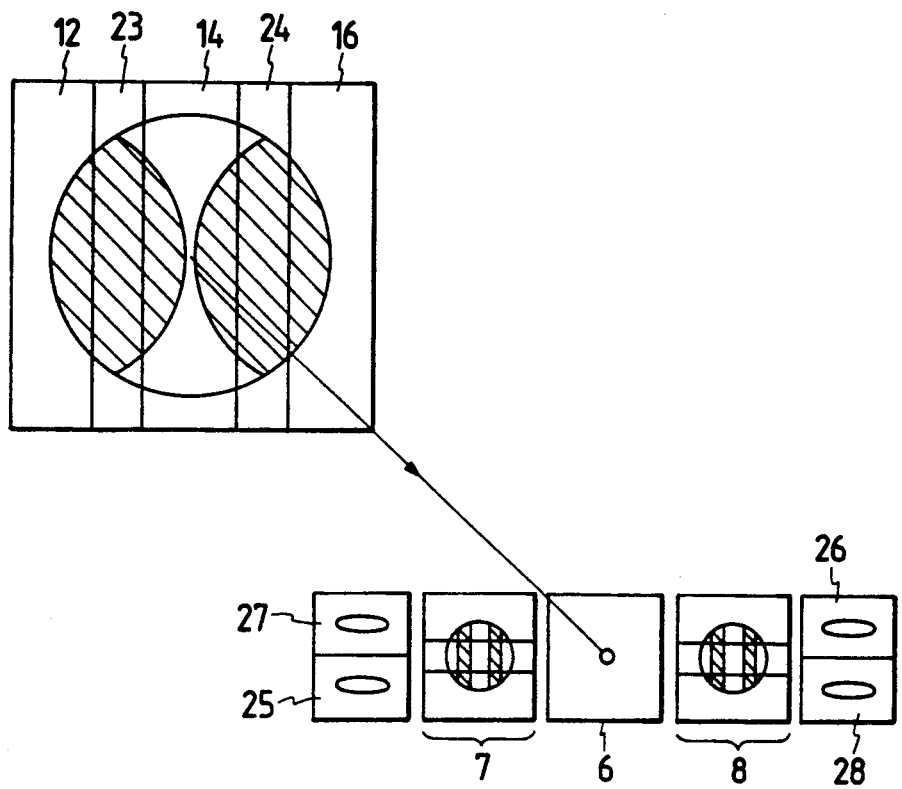
FIG. 6A shows an photodetector arrangement for obtaining a focus error signal, a tracking error signal and a magneto-optical signal by using a multi-window hologram.
Figure 6B:
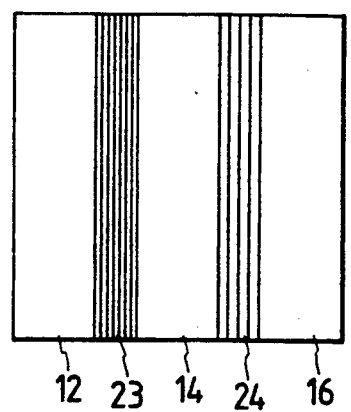
FIG. 6B is an illustration of an arrangement of a multi-window hologram.

FIG. 6A is an illustration for describing the case that the carrier frequencies of the holograms are changed, where detectors 25 and 26 are provided in correspondance with a polarization type hologram 23 and detectors 27 and 28 are provided for a polarization type hologram 24. In FIG. 6B, the carrier frequencies of the holograms 23 and 24 are higher than the carrier frequencies of the holograms 12, 14 and 16 for the focus error signal and, with the arrangement illustrated in FIG. 6B, the difference between the analyzing angles can be reduced.

Figure 7:
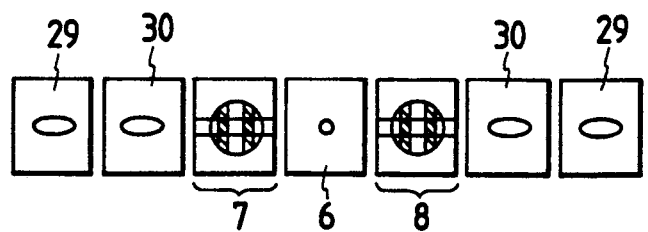
FIG. 7 shows an arrangement of a photodetector assembly.

In addition, if the carrier frequency of one of the polarization type holograms 23 and 24 becomes high relatively, it is possible that the analyzing angles are completely equal to each other. FIG. 7 shows detectors 29 and 30 corresponding to such holograms. With this arrangement, the detection of the photo-magnetic signal can be performed without varying the analyzing angles due to the multi-division polarization type hologram assembly.

Figure 8A:
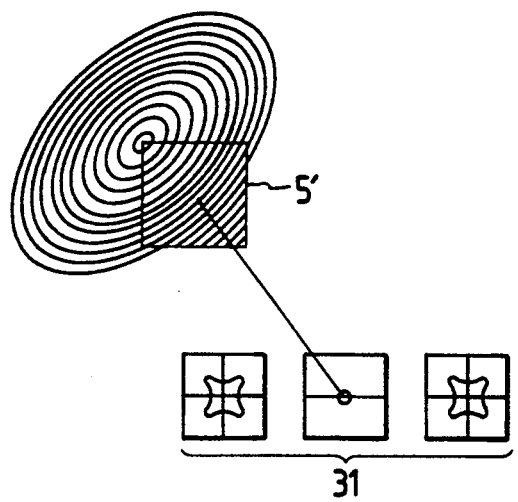
FIGS. 8A to 8C show arrangements of detector assemblies in the case of using different type holograms.
Figure 8B:
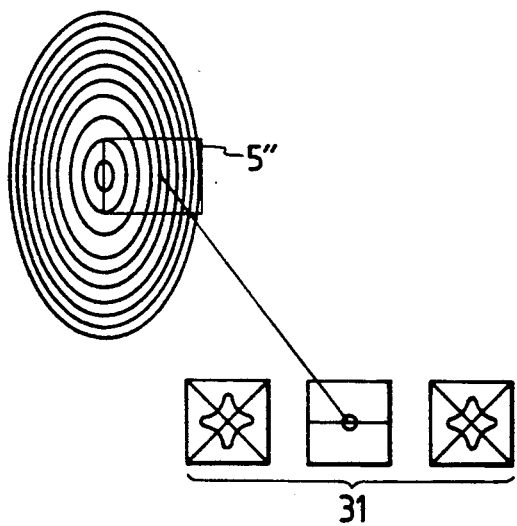

Although the examples described with reference to FIGS. 1 through 7 relate to the same focusing error detection system, it is also appropriate to produce astigmatism by using polarization type holograms 5' and 5" as illustrated in FIGS. 8A and 8B. The polarization type hologram 5' or 5" has a function corresponding to a cylindrical lens so as to produce the astigmatism. At this time, with respect to the ± first-order diffracted lights, the astigmatism is produced, whereby the focusing operation according to the astigmatism system can be performed with the detector assembly 31 being placed in the vicinity of the minimum confusion circle. Here, as the polarization type hologram is used a portion of a zone plate (for example) having elliptical channels. The configurations of the light spots formed on the detectors due to the + first-order diffracted lights are different from each other when the light beam from the objective lens 2 (FIG. 1A) is inadequately focused on the recording medium 3, that is, when the distance therebetween is inadequate.

Figure 8C:
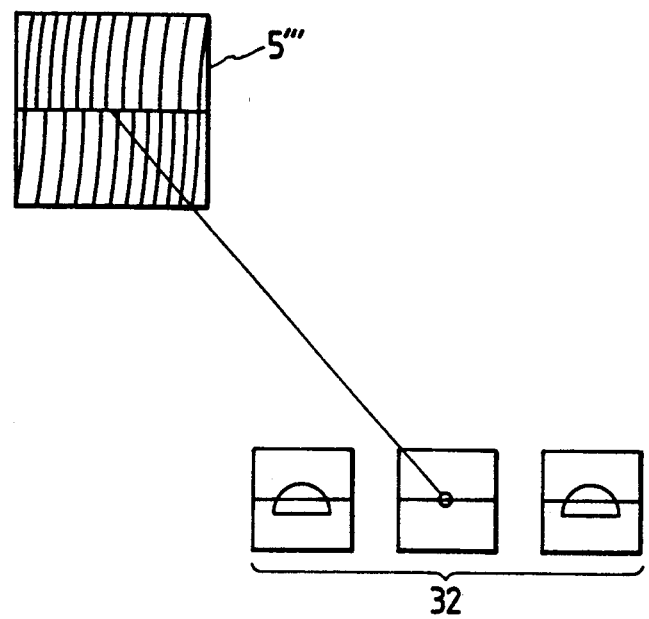

Furthermore, it is possible to use a double knife edge type detector assembly 32 in connection with a polarization type hologram 5''' as illustrated in FIG. 8C (see Japanese Patent Provisional Publication No. 61-120352). That is, semicircular beam spots which are different in the focusing state from each other are formed on the detector assembly 32. In this case, the polarization type hologram is required to be of the type to provide different focuses in its upper half and lower half with respect to the optical axis and to be blazed in the + first-order light. At this time, although the diffraction efficiencies of the zero-order light and the + first-order light are varied slightly, this can be eliminated by adjusting the amplifying gain of buffers to be coupled to the respective detectors.

Figure 9:
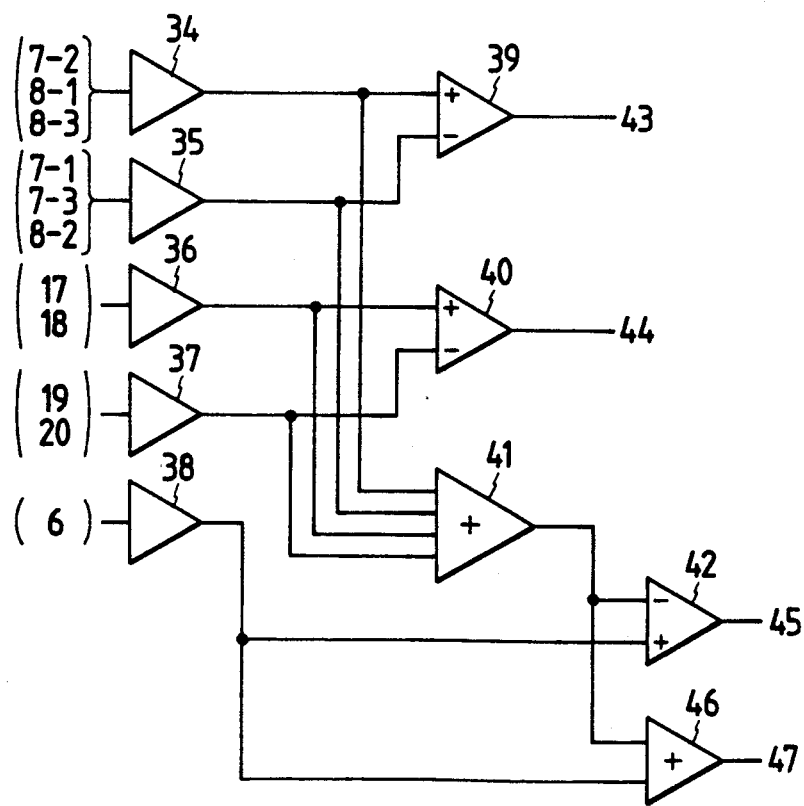
FIG. 9 is a circuit arrangement to be used in this embodiment.

FIG. 9 is a circuit arrangement for realizing this embodiment, where numerals indicated in parentheses represent the detectors illustrated in FIGS. 4 and 5A. Illustrated at numerals 34 to 38 are buffer amplifiers for mainly performing the transformation of impedance of each of the input signals (outputs of the respective detectors) thereto. The outputs of the buffer amplifiers 34 and 35 are supplied to a differential amplifier 39 for subtraction therebetween so as to obtain a focus error signal 43. The outputs of the buffer amplifiers 36 and 37 are supplied to a differential amplifier 40 for subtraction therebetween so as to attain a tracking error signal 44. The outputs of the buffer amplifiers 34 through 37 are added by an addition amplifier 41, and the addition signal is supplied to a differential amplifier 42 for subtraction from the output of the buffer amplifier 38 so as to attain a magneto-optical signal 45. If information is recorded on the recording medium with phase pattern or variable density pattern, the output of the addition amplifier 41 is added to the output of the buffer amplifier 38 so as to obtain an information signal.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. An optical head for optically recording and reproducing information on and from a recording medium, comprising:
    light source means;
    optical means for converging a light beam emitted from said light source means on said recording medium;
    beam splitter means provided between said light source means and said optical means for branching a light beam reflected from said recording medium;
    hologram means for causing transmission or reflection of the light beam branched by said beam splitter means as a zero-order light and ± first-order diffracted lights and for polarizing the light beam so that the zero-order light of P-polarization and the + first-order diffracted light of S-polarization produced due to the polarization are cross-polarized with respect to each other and the zero-order light of P-polarization and the − first-order diffracted light of S-polarization produced due to the polarization are cross polarized with respect to each other;
    a plurality of photodetector means for respectively receiving the zero-order light, the + first-order diffracted light and the − first-order diffracted light from said hologram means, and
    difference means for obtaining a differential output signal representing a difference between the diffracted light and the zero-order light,
    wherein said information is retrieved in accordance with said differential output signal,
    whereby polarization information in said information is detected.

2. An optical head as claimed in claim 1, wherein said hologram means is arranged such that, when the distance between said recording medium and said optical means is inadequate in terms of the convergence, the diameters of the light spots on said detector means due to the + first-order and − first-order diffracted lights are different from each other, and when the distance therebetween is adequate, the diameters thereof are substantially equal to each other.

3. An optical head as claimed in claim 1, wherein said hologram means is arranged such that, when the distance between said recording medium and said optical means is inadequate in terms of the convergence, the configurations of the light spots form on said detector means due to the + first-order and − first-order diffracted lights are different from each other, and when the distance therebetween is adequate, the configurations thereof are substantially equal to each other.

4. An optical head as claimed in claim 1, wherein said hologram means has at least three different pattern portions and said photodetector means has three portions for respectively receiving the + first-order diffracted light, − first-order diffracted light and zero-order light from said hologram means, the two of the three different pattern portions receiving the light beam mainly including a diffraction signal due to a track on said recording medium and the one of them receiving information relating to the distance between said recording medium and said optical means so that, when the distance between said recording medium and said optical means is inadequate in terms of the convergence, the diameters of the light spots form on said detector means due to the + first-order and − first-order diffracted lights are different from each other, and when the distance therebetween is adequate, the diameters thereof are substantially equal to each other.

5. An optical head as claimed in claim 1, wherein said hologram means has at least three different pattern portions and said photodetector means has three portions for respectively receiving the + first-order diffracted light, − first-order diffracted light and zero-order light from said hologram means, the two of the three different pattern portions receiving the light beam mainly including a diffraction signal due to a track on said recording medium and the one of them receiving information relating to the distance between said recording medium and said optical means so that, when the distance between said recording medium and said optical means is inadequate in terms of the convergence, the configurations of the light spots form on said detector means due to the + first-order and − first-order diffracted lights are different from each other, and when the distance therebetween is adequate, the configurations thereof are substantially equal to each other.

6. An optical head as claimed in claim 4, wherein said three different pattern portions of said hologram means have at least two different carrier frequencies.

7. An optical head as claimed in claim 5, wherein said three different pattern portions of said hologram means have at least two different carrier frequencies.

8. An optical head as claimed in claim 1, wherein said difference means comprises means for obtaining a difference between outputs of photodetector means receiving the zero-order light, and outputs of photodetector means receiving the + first-order and − first-order diffracted light.

9. An optical head as claimed in claim 8, wherein said optical head comprises means responsive to said difference means for reproducing magneto-optical polarization information from the recording medium in accordance with said difference between said outputs of photodetector means receiving the zero-order light and said photodetector means receiving the diffracted light of the + and − first-order light.

10. An optical head for optically recording and reproducing information on and from a recording medium, comprising:
light source means;
optical means for converging a light beam emitted from said light source means on said recording medium;
beam splitter means provided between said light source means and said optical means for branching a light beam reflected from said recording medium;
hologram means for producing diffracted lights of different diffraction order and of different focal points in an off-axis direction symmetrically arranged relative to said light source means and for causing transmission or reflection of the light beam branched by said beam splitter means as a zero-order light and ± first-order diffracted lights and for polarizing the light beam so that the zero-order light of P-polarization and the ± first-order diffracted light of S-polarization produced due to the polarization are cross polarized with respect to each other and the zero-order light of P-polarization and the − first-order diffracted light of S-polarization produced due to the polarization are cross polarized with respect to each other; and
photodetector means for receiving the zero-order light, the + first-order diffracted light and the − first-order diffracted light from said hologram means,
said photodetector means comprising diffracted light detecting means and zero-order detecting means, and
differential means for performing a difference operation on outputs from said diffracted light detecting means and said zero-order detecting means to obtain a differential signal to control retrieval of said information from the recording medium.

11. An optical head as claimed in claim 10, wherein said differential means comprises sum means for summing outputs of photodetector means receiving the + first-order and − first-order diffracted light and for outputting a sum signal representative thereof, and means for obtaining a difference between said sum signal and an output of said zero-order detecting means to produce said differential signal, thereby detecting polarization information from the information reproduced from the recording medium.

12. An optical head as claimed in claim 10, wherein said optical head comprises means responsive to said differential signal outputted by said differential means for reproducing information from the recording medium.

13. an optical head for optically recording and reproducing information on and from a recording medium, comprising:
light source means;
optical means for converging a light beam emitted from said light source means on said recording medium;
beam splitter means provided between said light source means and said optical means for branching a light beam reflected from said recording medium;

hologram means for producing diffracted lights of different diffraction order and of different focal points in an off-axis direction symmetrically arranged relative to said hologram means and for causing transmission or reflection of the light beam branched by said beam splitter means as a zero-order light and ± first-order diffracted lights and for polarizing the light beam so that the zero-order light of P-polarization and the + first-order diffracted light of S-polarization produced due to the polarization are cross polarized with respect to each other and the zero-order light of P-polarization and the − first-order diffracted light of S-polarization produced due to the polarization are cross polarized with respect to each other;

said hologram means including means for providing a P-polarization to the zero-order light and an S-polarization to the + and − first order diffracted light; and photodetector means for receiving the zero-order light, the + first-order diffracted light and the − first-order diffracted light from said hologram means, said photodetector means comprising diffracted light detecting means and zero-order detecting means, and differential means for performing a difference operation on outputs from said diffracted light detecting means and said zero-order detecting means to obtain a differential signal to control retrieval of said information from the recording medium.

14. An optical head as recited in claim 13, wherein said diffracted light detecting means comprises first detecting means for receiving the + first-order diffracted light and second detecting means for independently receiving the − first-order diffracted light, said first and second detecting means symmetrically disposed relative to said zero-order detecting means, and said differential means further comprising focus error means for performing a difference operation on outputs from said first and second detecting means to obtain a focus error signal, said optical head responsive to said differential signal for retrieving said information.

15. An optical head as recited in claim 14, wherein said first detecting means comprises a central detecting portion and a pair of peripheral detecting portions on opposite sides thereof, and said second detecting means comprises a central detecting portion and a pair of peripheral detecting portions on opposite sides thereof, and said focus error means comprises:

first and second adding means, said first means summing an output signal from said central detecting portion of said first detecting means and output signals from said peripheral portions of said second detecting means and said second means summing an output signal from said central detecting portion of said second detecting means and output signals from said peripheral portions of said first detecting means, and difference producing means receiving outputs from said first and second adding means for producing said focus error signal as a difference therebetween.

* * * * *